US006817526B2

(12) United States Patent
Claus

(10) Patent No.: US 6,817,526 B2
(45) Date of Patent: Nov. 16, 2004

(54) OPTOELECTRONIC DEVICE

(75) Inventor: Armin Claus, Nürtingen (DE)

(73) Assignee: Leuze Electronic GmbH & Co., Owen/Tech (DE)

( * ) Notice: Subject to any disclaimer, the term of this patent is extended or adjusted under 35 U.S.C. 154(b) by 0 days.

(21) Appl. No.: 10/619,568

(22) Filed: Jul. 16, 2003

(65) Prior Publication Data

US 2004/0011870 A1 Jan. 22, 2004

Related U.S. Application Data

(63) Continuation of application No. 10/375,064, filed on Feb. 28, 2003.

(30) Foreign Application Priority Data

Mar. 1, 2002 (DE) .......................................... 102 09 269

(51) Int. Cl.[7] .................................................. G06K 7/14
(52) U.S. Cl. ............. 235/454; 235/462.01; 235/462.36; 359/199; 359/226; 359/200; 359/196
(58) Field of Search .............................. 235/462.14, 17, 235/36, 38, 39, 40, 454, 470, 473; 359/212, 216, 196

(56) References Cited

U.S. PATENT DOCUMENTS 4,916,318 A * 4/1990 Iima ........................... 250/568
5,340,982 A * 8/1994 Nakazawa .................. 250/235
6,049,406 A * 4/2000 Zocca ........................ 359/196
6,527,184 B1 * 3/2003 Oliva ..................... 235/462.36
6,603,874 B1 * 8/2003 Stern et al. .................. 382/144
2002/0145048 A1 * 10/2002 Liou et al. ............. 235/472.03

FOREIGN PATENT DOCUMENTS

| DE | 19845946 C1 | * | 8/1999 | ............ G06K/7/10 |
| DE | 198 44 238 A1 | | 4/2000 | |
| WO | WO 00/16239 A1 | | 3/2000 | |

* cited by examiner

Primary Examiner—Karl D. Frech
Assistant Examiner—Daniel Walsh
(74) Attorney, Agent, or Firm—Venable LLP; Catherine M. Voorhees

(57) ABSTRACT

An optoelectronic device for detecting markings provided with contrasting patterns includes a transmitter for emitting light rays and a receiver for receiving light rays, a deflection unit for guiding the transmitting light rays periodically across a monitoring range, and an evaluation unit for evaluating the receiving signals present at the output of receiver. The receiver is positioned inside a light-impermeable insert, which is provided with channel structures extending in the direction of the optical axis of the receiver. The receiving light rays that are reflected by the deflection unit are guided inside these channel structures toward the receiver.

17 Claims, 3 Drawing Sheets

OPTOELECTRONIC DEVICE

CROSS-REFERENCE TO RELATED APPLICATION

This application is a continuation of U.S. application Ser. No. 10/375,064 filed on Feb. 28, 2003, which claimed the priority of German Patent Application No. 102 09 269.9 filed Mar. 1, 2002, the priority of which is also claimed herein. The disclosures of each of the foregoing applications, and each and every U.S., foreign and International patent and patent application mentioned below are incorporated herein by reference.

BACKGROUND OF THE INVENTION

The invention relates to an optoelectronic device for detecting markings provided with contrasting patterns, comprising: a transmitter for emitting transmitting light rays, a receiver for receiving light rays, a deflection unit positioned for periodically reflecting the transmitting light rays across a monitoring range and for reflecting receiving light rays that are reflected by the markings, and an evaluation unit for evaluating the receiving signals present at the receiver output.

An optoelectronic device of this type is disclosed in German Patent Document DE 198 44 238 A1. This optoelectronic device is used to detect markings, in particular in the form of barcodes. The optoelectronic device comprises a transmitter that is followed by a transmitting optic and a receiver that is preceded by a receiving optic. The transmitting light rays emitted by the transmitter and the receiving light rays reflected by the markings are guided over a deflection unit. The deflection unit consists of a rotating polygonal mirror wheel with a predetermined number of mirror surfaces. With the aid of the deflection unit, the transmitting light rays are periodically guided over a monitoring range.

Diverse reflecting mirrors across which the transmitting light rays and the receiving light rays are guided are arranged between the transmitter and the deflection unit as well as between the receiver and the deflection unit. The transmitting light rays and the receiving light rays are respectively guided over the same mirror surface of the polygonal mirror wheel.

The optoelectronic device thus has a plurality of optical components across which the transmitting light rays and the receiving light rays must be guided.

The individual components, particularly the reflecting mirrors, must be suitably adjusted, which results in an undesirably high assembly expenditure during the manufacture of the optoelectronic device. The optoelectronic device furthermore has an undesirably large structural shape, particularly since a large amount of space is required for arranging the reflecting mirrors and the receiving optic in front of the receiver.

A particular disadvantage in this connection is the large gap necessary between the receiving optic and the deflection unit as a result of the predetermined focal length of the receiving optic.

A further and essential disadvantage of optoelectronic devices of this type is that an undesirably high share of parasitic and extraneous light rays unavoidably impinge on the receiver as a result of the large surface area of the receiving optic, thus reducing the detection safety of the optoelectronic device.

A different optoelectronic device of the type first mentioned above is known from International Publication WO 00/16 239 and is used for detecting barcodes. With this optoelectronic device, the transmitter and the receiver are arranged one above the other and at a distance to each other. The transmitting light rays emitted by the transmitter and the receiving light rays reflected back by the markings are guided across a deflection unit. The deflection unit is a polygonal mirror wheel with a predetermined number of mirror surfaces. The transmitting light rays and the receiving light rays are respectively guided over the same mirror surface of the polygonal mirror wheel. The transmitting light rays and the receiving light rays guided so as to be spatially separated. Thus, the transmitting light rays impinge on the upper partial segment of the respective mirror surface of the polygonal mirror wheel while the receiving light rays are guided over the lower partial segment of the same mirror surface.

The partial segments of the mirror surface where the transmitting light rays and the receiving light rays impinge must be clearly offset against each other to obtain a spatial separation between the transmitting light rays and the receiving light rays.

To achieve the desired spatial separation between the transmitting light rays and the receiving light rays, the height of the polygonal mirror wheel must be increased noticeably as compared to traditional polygonal mirror wheels. In turn, this requires an undesirable enlargement of the structural shape of the optoelectronic device.

SUMMARY OF THE INVENTION

It is therefore an object of the invention to provide an optoelectronic device of the aforementioned type in such a way that the highest possible detection safety is ensured with the smallest possible structural shape.

The above and other objects are accomplished by the invention by the provision of an optoelectronic device for detecting markings provided with contrasting patterns, comprising: a transmitter for emitting transmitting light rays; a receiver for receiving light rays, the receiver having an optical axis; a deflection unit positioned for periodically reflecting the transmitting light rays across a monitoring range and for reflecting receiving light rays that are reflected by the markings; an evaluation unit for evaluating the receiving signals present at the receiver output; and a light-impermeable insert within which the receiver is positioned, the insert including channel structures extending in a direction of the optical axis for the receiver, for guiding the receiving light rays reflected by the deflection unit to the receiver.

One essential advantage of the invention is that the receiver inside the insert is located directly opposite the deflection unit without a receiving optic and reflecting mirrors positioned in-between. As a result, the distance between receiver and deflection unit can be kept very short, which results in a corresponding reduction in the structural size of the optoelectronic device. The number of optical components of the optoelectronic device is consequently also reduced considerably, so that the device can be produced easily and at low cost.

Another essential advantage of the optoelectronic device according to the invention is that the parasitic and extraneous light rays impinging on the receiver are reduced considerably as a result of the guidance of the receiving light inside the channel structures of the insert. In turn, this leads to a high detection safety for the optoelectronic device.

This reduction is based on the fact that the geometry of the insert is adapted optimally to the guidance of the receiving light rays because the channels of the channel structures extend parallel to the optical receiver axis. The receiving light rays traveling along the optical axis therefore impinge almost without obstruction on the receiver. In contrast, parasitic and extraneous light rays that impinge at an angle hit the light-impermeable wall elements of the channel structures and thus can no longer hit the receiver.

For an optimum blocking of the parasitic and extraneous light rays, the channel structures are designed to be as long as possible and to extend right up to the deflection unit. The channel structures additionally form a honeycomb-type pattern, consisting of several channels for which the diameters are considerably smaller than the lengths. As a result, it is ensured that even parasitic and extraneous light rays arriving at very small angles to the optical axis of the receiver hit the wall elements of the channel structures and not the receiver.

According to one advantageous embodiment, the wall elements of the channel structures are roughened up or further structured, thus functioning as light traps for the parasitic and extraneous light rays. That is to say, the rays are prevented from finally reaching the receiver following multiple reflections on the wall elements.

According to one exemplary modification of the invention, the insert can consist of a conductive material, thus providing the receiver with additional EMC (electromagnetic compatibility) protection.

In a further exemplary embodiment of the invention, the transmitting light rays and the receiving light rays extend coaxially. For this, the transmitter is also arranged inside the insert and is positioned directly behind the receiver. The transmitting light rays are guided through a recess in the light-sensitive surface of the receiver. As a result, the transmitting light rays are at least partially enclosed by the light-sensitive surface.

The transmitting light rays and the receiving light rays for this embodiment are guided inside separate channels of the channel structure, thus resulting in a nearly complete separation of the transmitting light rays from the receiving light rays.

The aforementioned embodiment furthermore has an especially compact design.

BRIEF DESCRIPTION OF THE DRAWINGS

The invention is explained in the following with the aid of the drawings, which show in.

DETAILED DESCRIPTION OF THE INVENTION

Figure 1:
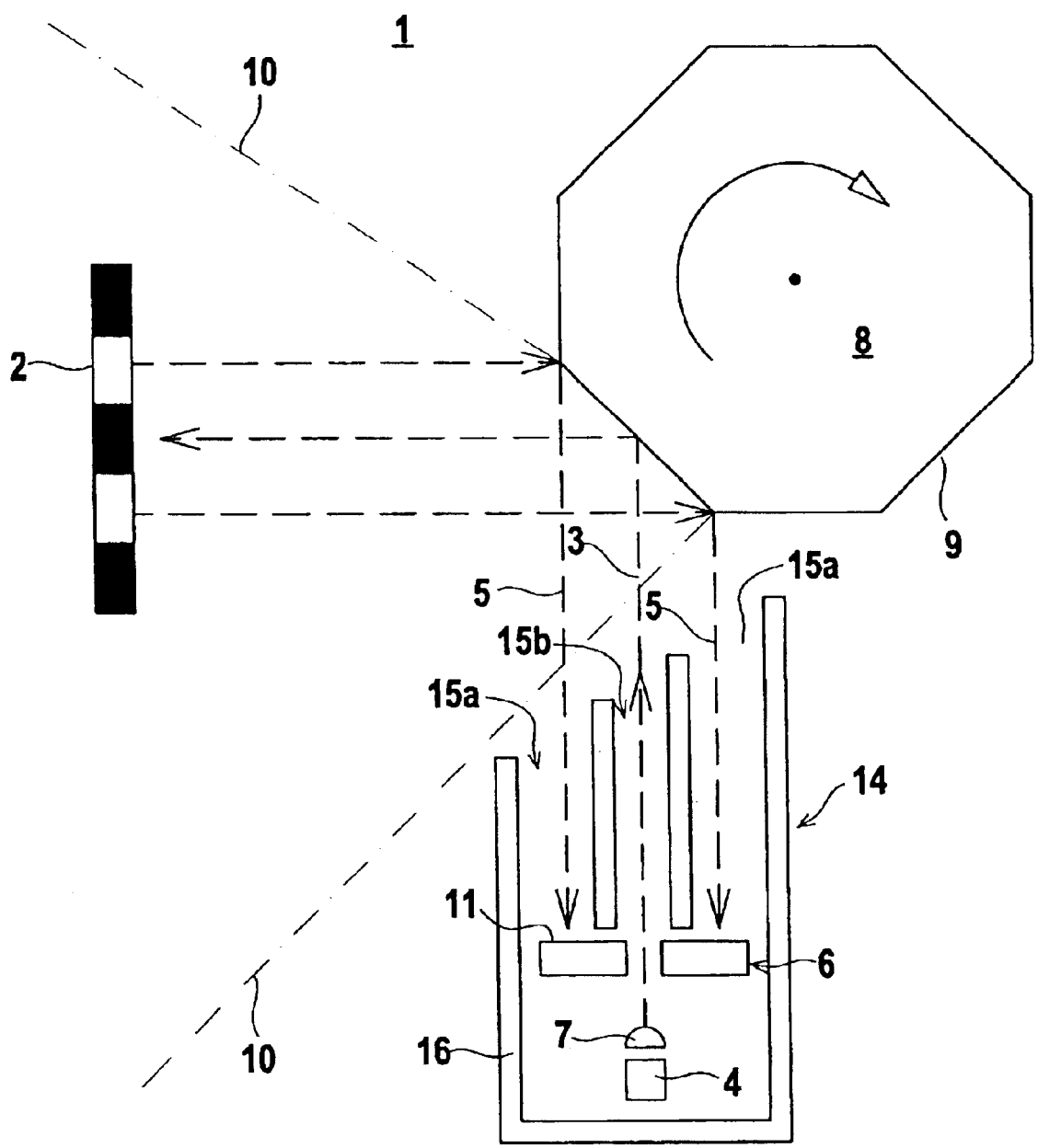
FIG. 1 is a schematic representation of an exemplary embodiment of the optoelectronic device according to the invention.

Referring to FIG. 1, there is shown a schematic diagram of an exemplary embodiment of an optoelectronic device 1 for detecting markings provided with defined contrasting patterns according to the invention. In principle, the markings can have optional sequences and shapes of adjacent light/dark surfaces, preferably black/white surfaces. The invention is explained in the following for the case where the markings take the form of barcodes 2. The barcodes 2 essentially consist of a sequence of black and white line elements of a defined length and width.

The optoelectronic device 1 comprises a transmitter 4 that emits light rays 3 and a receiver 6 that receives light rays 5. A transmitting optic 7 for focusing the transmitting light rays 3 is installed behind the transmitter 4, which is preferably a laser diode.

The transmitting light rays 3 emitted by the transmitter 4 and the receiving light rays 5 that are reflected back by the barcode 2 are guided over a deflection unit. The deflection unit consists of a motor-driven polygonal mirror wheel 8 with a predetermined number of facet-type mirror surfaces 9.

As a result of the rotational movement of the polygonal mirror wheel 8, the transmitting light rays 3 are periodically guided over a monitoring range 10, located in a scanning plane. The monitoring range 10 extends over a specific angular region, which is predetermined by the number of mirror surfaces 9 of the polygonal mirror wheel 8.

The receiving signals present at the output of the receiver 6 are amplified in an amplifier that is not shown herein and are evaluated in an evaluation unit, which is also not shown herein.

The amplitude modulation of the receiving light rays 5, which are reflected on the barcodes 2, corresponds to the sequence of black and white line elements in the barcode 2. The receiving signals, which are present at the output of receiver 6, have a corresponding amplitude modulation. The analog, amplitude-modulated receiving signals are evaluated in the evaluation unit with the aid of a threshold value unit. Binary signal sequences are thus generated, which are then used to detect the barcodes 2 through a comparison with stored contrast patterns for barcodes 2.

The transmitting light rays 3 that are emitted by the transmitter 4 and guided onto the deflection unit, and the receiving light rays 5 that are reflected back by the markings via the deflection unit to the receiver 6 extend coaxially for the embodiment according to FIG. 1.

This coaxial ray guidance is achieved in that the light-sensitive surface 11 of the receiver 6, which is installed directly behind the transmitter 4 and the transmitting optic 7, at least partially encloses the transmitting light rays 3.

For the ray guidance, the receiver 6 and its light-sensitive surface 11 are provided with a recess 12 through which the transmitting light rays 3 are guided.

The transmitter 4 and the receiver 6 are at such a distance to the polygonal mirror wheel 8 that the transmitting light rays 3 and the receiving light rays 5 are guided over the same mirror surface 9 of the polygonal mirror wheel 8. For the case in question, the mirror surfaces 9 of the polygonal mirror wheel 8 are oriented perpendicular to the ray axes of the transmitting light rays 3 and the receiving light rays 5, looking into the plane of the paper. The receiving light spot projected onto a mirror surface 9 at least partially encloses the transmitting light spot of the transmitting light rays 3 projected onto the same mirror surface 9. The geometry of the mirror surfaces 9 is adapted to the geometry of the transmitting light rays 3 and the receiving light rays 5, such that these illuminate the mirror surface 9 as completely as possible.

Figure 2:
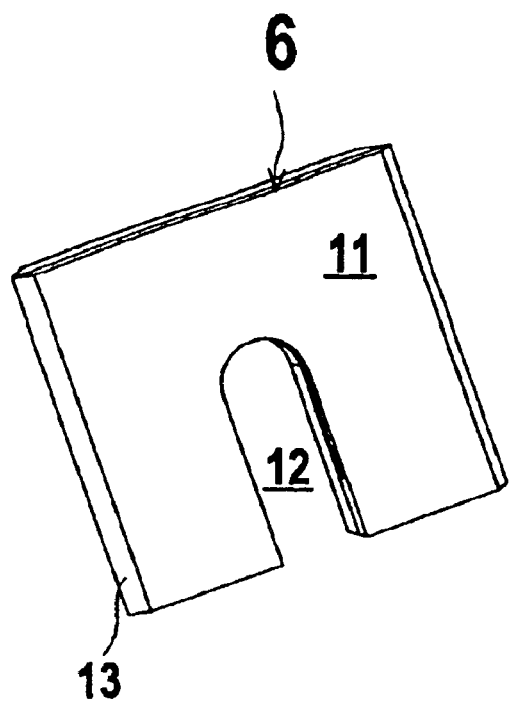
FIGS. 2 and 3 show different embodiments of the receiver for the optoelectronic device according to FIG. 1.
Figure 3:
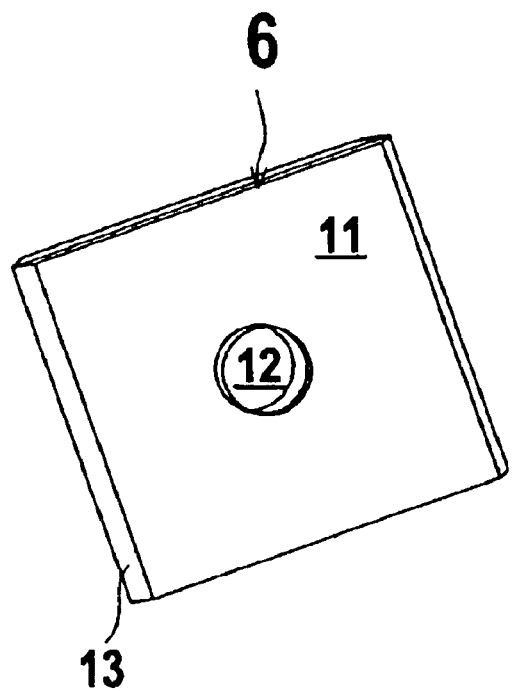

FIGS. 2 and 3 show two exemplary embodiments of the receiver 6 for the optoelectronic device 1 according to FIG. 1. The receiver 6 has a large, level, light-sensitive surface 11 with an essentially square outer contour. The light-sensitive surface 11 is homogeneous for the exemplary embodiments according to FIGS. 2 and 3, meaning it has a one-piece design. Alternatively, the receiver 6 can consist of a number of receiving elements, respectively provided with light-sensitive partial surfaces that jointly form the light-sensitive surface 11.

The receiver 6 is mounted on a support 13 that can be connected with connections that are not shown herein to a circuit board on which the evaluation unit is integrated. The cross-sectional surface of the support 13 is adapted to the size of the light-sensitive surface 11.

With the exemplary embodiment according to FIG. 2, the recess 12 extends from the center of the receiver 6 to a lower edge of the receiver where the recess ends.

For the exemplary embodiment according to FIG. 3, the recess 12 is a circular, central bore that extends through the light-sensitive surface 11 and the support 13 positioned behind it.

With both embodiments, the diameters of the recesses are larger than the diameters for the transmitting light rays 3, so that the transmitting light rays can pass through the recess without obstruction.

The transmitter 4, the transmitting optic 7, and the receiver 6 with the support 13 jointly form a structural unit that is integrated into a light-impermeable insert 14. The insert 14 is preferably a die cast part that is made of zinc and thus of a conductive material. The insert provides EMC (electromagnetic compatibility) protection for the electrical and/or optoelectronic components positioned in its inside space. Alternatively, the insert can also be a plastic injection-molded part.

These components are arranged in the bottom region of the insert 14. The cross-sectional surface of the insert 14 in this case is adapted to the size of the receiver 6 surface. The insert 14 is provided with channel structures, inside of which the receiving light rays 5 and/or the transmitting light rays 3 are guided. The channel structures consist of a predetermined number of channels 15a, b that are delimited by light impermeable wall elements 16 of the insert 14.

The channel structures form a honeycomb-type pattern, wherein the channels 15a, b respectively have a constant cross section. The longitudinal axes of the channels 15a, b extend parallel to the optical axes of the transmitter 4 and the receiver 6. The wall elements 16 of insert 14, which delimit the channels 15a, b, end immediately in front of the light-sensitive surface 11 of the receiver 6 and are oriented perpendicular to the light-sensitive surfaces 11.

The lengths of channels 15a, b are dimensioned such that the channel structures extend right up to the deflection unit, without obstructing the scanning of the monitoring range 10. As a result, the channels 15a, b are shorter in the region of the front edge of the polygonal mirror wheel 8, as shown in FIG. 1, than the channels 15a, b in the center region of the polygonal mirror wheel 8. A maximum extension of the channel structures in the direction of the deflection unit thus ensures that the wall elements 16 of the insert 14 are positioned outside of the monitoring range 10 which is scanned by the transmitting light rays 5 and the receiving light rays 3.

The use of the insert 14 considerably increases the detection sensitivity of the optoelectronic device 1 due to the fact that the receiving light rays 5 are guided inside the channel structures. The rays are guided over nearly the complete distance between deflection unit and the receiver 6 while parasitic and extraneous light rays are blocked by the insert 14, such that they cannot reach the receiver 6.

In the process, use is made of the circumstance that the ray axes for the receiving light rays 5 reflected by the deflection unit extend perpendicular to the plane for the light-sensitive surface 11 while the parasitic and extraneous light rays are transmitted from a large angular region in the direction of the receiver 6. The receiving light rays 5 are guided by the channels 15a, b that extend parallel to the axis of the receiving light rays 5, without noticeable reflections along the wall elements 16 of the channel structures to the receiver 6. Since the cross section of the insert 14 is adapted to the size of the light-sensitive surface 11, the receiving light rays 5 are projected almost completely onto the light-sensitive surface 11 of the receiver 6.

The parasitic and extraneous light rays which primarily hit the channel structures at slanted angles hit the wall elements 16 of the channel structures instead and not the receiver 6. Since the longest possible lengths are selected for the channels 15a, b, the parasitic and extraneous light rays would arrive at the receiver 6 only after being reflected several times along the wall elements 16. The surfaces of the wall elements 16, however, absorb a high amount of light. In addition, the surfaces are preferably roughed up or structured, thus causing the wall elements 16 to function as light traps, so that multiple reflections of parasitic and extraneous light rays are efficiently prevented.

The honeycomb-type pattern of the channel structures comprises a predetermined number of elongated channels 15a, b with small cross-sectional surfaces relative to their lengths. As a result, it is ensured that only those parasitic and extraneous light rays can travel to the receiver 6, which extend along the optical axis of the receiver 6 or at a narrowly limited angle thereto.

Figure 4:
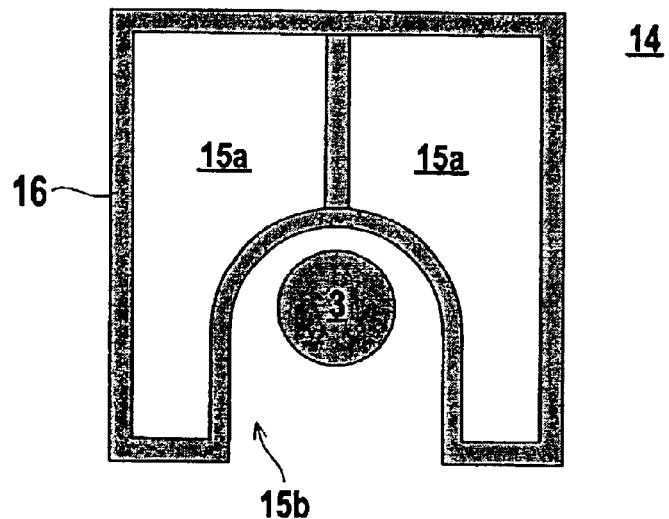
FIGS. 4 to 6 show different embodiments of the inserts for the optoelectronic device according to FIG. 1.
Figure 5:
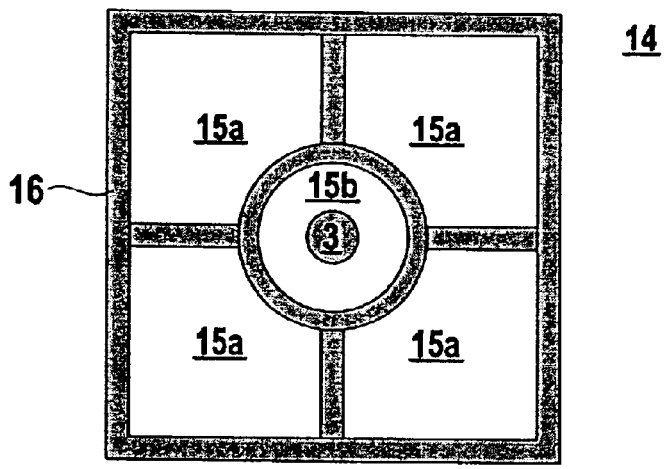
Figure 6:
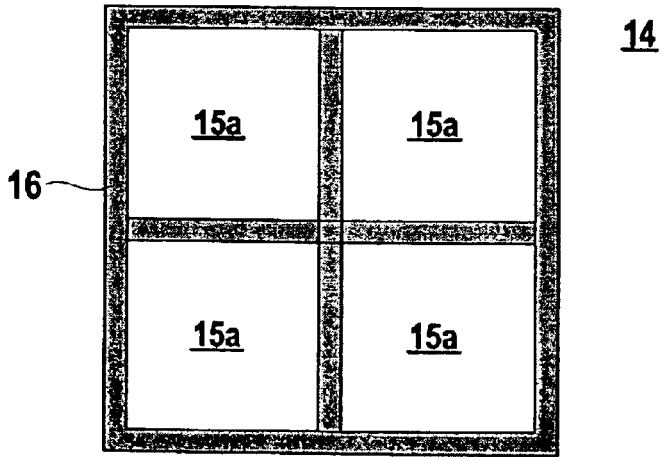

FIGS. 4–6 show examples of channel structures of this type. FIGS. 4–6 respectively show a view from above the top of the insert 14.

The honeycomb-type pattern of the insert 14 according to FIG. 4 corresponds to that for the insert 14 used in the optoelectronic device 1 according to FIG. 1 in which the transmitter 4 and the receiver 6 are arranged one behind the other. The insert 14 according to FIG. 4 contains a receiver 6, the light-sensitive surface 11 of which has the form as shown in FIG. 2.

The channel structure of the insert 14 according to FIG. 4 has two identically designed, mirror-symmetrically arranged channels 15a, inside of which the receiving light rays 5 are guided. The light-sensitive surface 11 of the receiver 6 is adapted in the bottom region of the insert 14 to the geometry of the channels 15a, such that it extends across all cross-sectional areas of the channels 15a.

The channel structure of the insert 14 furthermore has a channel 15b that ends at one sidewall of the insert 14. The transmitting light rays 3 that are emitted by the transmitter 4 are guided inside this channel 15b. An optical separation of the transmitting light rays 3 and the receiving light rays 5 is achieved with the wall element 16 between this channel 15b and the two adjacent channels 15a. FIG. 4 shows that the transmitting light rays 3 have a smaller cross section than the channel 15a, so that the transmitting light rays 3 are guided in this channel without being reflected on the adjacent wall element 16.

FIG. 5 shows a different embodiment of an insert 14, which can be used for the optoelectronic device 1 according to FIG. 1. The transmitter 4 and the receiver 6 are again arranged one behind the other in the bottom region of the insert 14. For the present case, the receiver 6 takes the form as shown in FIG. 3, meaning the transmitting light rays 3 are guided through a central bore in the light-sensitive surface 11. The geometry of the channel structures for the insert 14 according to FIG. 5 is adapted to this transmitter/receiver arrangement.

The insert 14 is provided with four identically designed first channels 15a through which the receiving light rays 5 travel to the light-sensitive surface 11 of the receiver 6. A second channel 15b is provided with a circular cross-section through which the transmitting light rays 3 are guided. As shown for the embodiment according to FIG. 4, the cross-sectional surface of this channel 15b is larger than the cross section of the transmitting light rays.

FIG. 6 shows an embodiment of an insert 14, which is designed for inserting a receiver 6 with a light-sensitive surface 11 that extends over the complete cross sectional surface of the inside space for insert 14.

This insert 14 is suitable for use in an optoelectronic device 1 having only the receiver 6 arranged inside the insert 14 while the transmitter 4 is located outside of the insert 14.

In that case, the insert 14 is provided only with channels 15a for guiding the receiving light rays 5. FIG. 6 shows identical designs for the channels 15a. However, the channels 15a can in principle have a different cross-sectional geometry.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optoelectronic device for detecting markings provided with contrasting patterns, comprising:
   a transmitter for emitting transmitting light rays;
   a receiver for receiving light rays, the receiver having an optical axis;
   a deflection unit positioned for periodically reflecting the transmitting light rays across a monitoring range and for reflecting receiving light rays that are reflected by the markings;
   an evaluation unit for evaluating the receiving signals present at the receiver output; and
   a light-impermeable insert within which the receiver is positioned, the insert including channel structures extending in a direction of the optical axis of the receiver, of guiding the receiving light rays reflected by the deflection unit to the receiver.

2. The optoelectronic device according to claim 1, wherein the insert has a bottom and a bottom region adjacent the bottom, the receiver is arranged in the bottom region of the insert, and the channel structures include wall elements delimiting channels and projecting perpendicular from the bottom of the insert.

3. The optoelectronic device according to claim 2, wherein the channel structures define a honeycomb pattern with channels extending parallel to the optical axis of the receiver.

4. The optoelectronic device according to claim 2, wherein the receiver has a light-sensitive surface and the insert has a cross-section adapted to a size of the light-sensitive surface of the receiver.

5. The optoelectronic device according to claim 4, wherein the light-sensitive surface of the receiver is homogeneous and coherent.

6. The optoelectronic device according to claim 4, wherein the receiver includes a number of receiving elements each having a light-sensitive partial surface that constitutes a component of the light-sensitive surface.

7. The optoelectronic device according to claim 2, wherein the wall elements of the channel structures include one of roughed-up surfaces and structured surfaces.

8. The optoelectronic device according to claim 1, wherein the insert comprises one of a metal die cast part and an injection-molded plastic part.

9. The optoelectronic device according to claim 1, wherein the insert comprises an electrically conductive material.

10. The optoelectronic device according to claim 9, wherein the transmitter and the receiver are both positioned within the insert.

11. The optoelectronic device according to claim 10, wherein the transmitting light rays and the receiving light rays are guided coaxially across the deflection unit.

12. The optoelectronic device according to claim 4, wherein the light-sensitive surface of the receiver at least partially encloses the transmitting light rays.

13. The optoelectronic device according to claim 4, wherein the light-sensitive surface of the receiver includes a recess and the transmitter is arranged behind the receiver so that the transmitting light rays are guided through the recess.

14. The optoelectronic device according to claim 13, wherein the recess is a central bore in the light-sensitive surface of the receiver.

15. The optoelectronic device according to claim 14, wherein the recess ends at one edge of the receiver.

16. The optoelectronic device according to claim 2, wherein the transmitting light rays and the receiving light rays are guided inside separate channels of the channel structures in the insert.

17. The optoelectronic device according to claim 16, wherein the deflection unit comprises a polygonal mirror wheel with a number of mirror surfaces, and a receiving light spot of the receiving light rays that is projected onto one mirror surface at least partially encloses a transmitting light spot projected onto the same mirror surface.

* * * * *